United States Patent
Kuo

(10) Patent No.: US 8,002,453 B2
(45) Date of Patent: Aug. 23, 2011

(54) LIGHT-EMITTING DIODE BACKLIGHT MODULE AND LIQUID CRYSTAL DISPLAY USING THE SAME

(75) Inventor: Han-Ping Kuo, Hsinchu (TW)

(73) Assignee: AU Optronics Corporation, Hsin-Chu (TW)

( * ) Notice: Subject to any disclaimer, the term of this patent is extended or adjusted under 35 U.S.C. 154(b) by 373 days.

(21) Appl. No.: 11/385,180

(22) Filed: Mar. 20, 2006

(65) Prior Publication Data
US 2007/0133227 A1  Jun. 14, 2007

(30) Foreign Application Priority Data
Dec. 12, 2005 (TW) .............................. 94143924 A

(51) Int. Cl.
*F21V 8/00* (2006.01)
*G02B 6/42* (2006.01)
(52) U.S. Cl. ......... 362/613; 362/555; 362/612; 362/633
(58) Field of Classification Search .......... 362/611–613, 362/632–634, 27, 559, 555; 385/901
See application file for complete search history.

(56) References Cited

U.S. PATENT DOCUMENTS

| | | | | |
|---|---|---|---|---|
| 4,461,974 A | * | 7/1984 | Chiu ............................. | 385/100 |
| 5,477,422 A | * | 12/1995 | Hooker et al. .................. | 362/29 |
| 5,613,751 A | * | 3/1997 | Parker et al. .................. | 362/627 |
| 5,618,096 A | * | 4/1997 | Parker et al. .................. | 362/629 |
| 6,676,268 B2 | * | 1/2004 | Ohkawa ........................ | 362/613 |
| 6,825,894 B2 | * | 11/2004 | Aoyagi et al. .................. | 349/65 |
| 6,913,366 B2 | * | 7/2005 | Lee ................................ | 362/613 |
| 6,976,779 B2 | * | 12/2005 | Ohtsuki et al. ................ | 362/608 |
| 6,979,095 B2 | * | 12/2005 | Min et al. ...................... | 362/611 |
| 6,992,736 B2 | * | 1/2006 | Saito et al. ..................... | 349/65 |
| 7,001,058 B2 | * | 2/2006 | Inditsky ......................... | 362/610 |
| 7,101,070 B2 | * | 9/2006 | Yu et al. ......................... | 362/558 |
| 7,139,048 B2 | * | 11/2006 | Han et al. ........................ | 349/62 |
| 7,157,853 B2 | * | 1/2007 | Imai et al. ...................... | 313/512 |
| 7,241,040 B2 | * | 7/2007 | Ahn et al. ....................... | 362/613 |
| 7,275,851 B2 | * | 10/2007 | Sakurai ........................... | 362/612 |
| 7,350,955 B2 | * | 4/2008 | Chang et al. .................. | 362/612 |
| 7,507,010 B2 | * | 3/2009 | Ide ................................. | 362/613 |
| 7,570,321 B2 | * | 8/2009 | Takahashi et al. .............. | 349/65 |
| 2004/0145914 A1 | | 7/2004 | Yu et al. ......................... | 362/558 |
| 2006/0077693 A1 | * | 4/2006 | Ko et al. ........................ | 362/633 |
| 2006/0087866 A1 | * | 4/2006 | Ng et al. ....................... | 362/612 |

FOREIGN PATENT DOCUMENTS

| TW | 566 564 | 12/2003 |
|---|---|---|
| TW | 584 760 | 4/2004 |
| TW | 595 732 | 7/2004 |

\* cited by examiner

*Primary Examiner* — Alan Cariaso
(74) *Attorney, Agent, or Firm* — Thomas, Kayden, Horstemeyer & Risley, LLP

(57) ABSTRACT

A backlight module is disclosed for reducing the occurrence of corner dark space. In the backlight module, two tightly adjacent light-emitting diodes (LEDs) are disposed near a light-guide plate, and each of the LEDs is tilted outwards with a predetermined angle, wherein an outer angle extending from two respective light-emitting surfaces of the LEDs is about between 90 degrees and 180 degrees.

14 Claims, 5 Drawing Sheets

LIGHT-EMITTING DIODE BACKLIGHT MODULE AND LIQUID CRYSTAL DISPLAY USING THE SAME

RELATED APPLICATIONS

The present application is based on, and claims priority from, Taiwan Application Serial Number 94143924, filed Dec. 12, 2005, the disclosure of which is hereby incorporated by reference herein in its entirety.

BACKGROUND

1. Field of Invention

The present invention relates to a backlight module. More particularly, the present invention relates to a light-emitting diodes (LED) backlight module that can reduce dark stripes.

2. Description of Related Art

A backlight module is one of the fundamental parts in a liquid crystal display (LCD). Since liquid crystal does not emit light itself, the backlight module is needed for providing the required light source. The principle for operating a backlight module is to direct the light emitted from a backlight source as a planar light source via a light guide plate, thereby assuring uniform brightness. A backlight source commonly used in the backlight module can be a cold cathode fluorescent lamp (CCFL) and an LED, etc. Although the CCFL is the main trend currently, yet the demands for using the LED as the backlight source have been increasing daily. In comparison with the CCFL used as the backlight source, the LED has the advantages of small size, long operation life, low driving voltage, low power consumption and excellent shock resistance, etc.

The LED is a point light source, and thus the shadow display of dark stripes appears between two adjacent LEDs applied in an LED backlight module, due to the size and arrangement of the backlight module; and the light-emitting surfaces of the LEDs which are too close to an active area of the light guide plate. Referring to FIG. 1, FIG. 1 is a schematic diagram illustrating dark stripes shown on a conventional LCD. The conventional LCD comprises a rectangle frame 102 having four connected sides; and an LED 10 and an LED 12 mounted on one of the four connected sides of the rectangle frame 102. There is a distance between the LED 10 and LED 12, and the LED 10 and LED 12 have a light scattering angle A1 and a light scattering angle A2 respectively, wherein the light scattering angle A1 and A2 are generally between 90 degrees and 110 degrees. Such as shown in FIG. 1, when the LEDs 10 and 12 are very close to the active area of the LCD, dark-stripe regions 30 are clearly shown between the LEDs 10 and 12; and between the LEDs 10 and 20 and the rectangle frame 102. Although the dark-stripe regions 30 can be reduced by increasing the distance between the active area and the LEDs 10 and 20, yet the increased distance would reduce the intensity of the light emitted onto the active area from the LEDs 10 and 20, so that the LEDs have to be applied with bigger power to prevent light intensity reduction. Besides, when the distance between the active area and the LEDs 10 and 20 is increased, a light guide plate with larger area has to be used, thus not only causing the increase of production cost but also failing to effectively utilize the limited space in the backlight module.

SUMMARY

Hence, an aspect of the present invention is to provide a backlight module for reducing the occurrence of dark-stripe regions by tilting two adjacent LEDs outwards with a predetermined angle.

In accordance with a preferred embodiment, the backlight module comprises a light guide plate, a first LED having a first light-emitting surface, and a second LED having a second light-emitting surface, wherein the first LED is disposed near the light-guide plate, and the second LED adjoins the first LED, and an outer angle between two respective reference surfaces extending from the first light-emitting surface and the second light-emitting surface is substantially between 90 degrees and 180 degrees. The first light-emitting surface and the second light-emitting surface form an angle substantially between 90 degrees and 180 degrees.

In accordance with another preferred embodiment, the backlight module comprises a light guide plate and a plurality of LED sets evenly spaced from each other, wherein the LED sets are disposed near at least one side of the light-guide plate. Each of the LED set comprises the aforementioned first LED and second LED.

The aforementioned first LED and second LED can be packaged as one unit.

In accordance with still another preferred embodiment, the backlight module comprises a light guide plate and at least one LED. The LED is disposed near the light-guide plate, and comprises a first light-emitting surface and a second light-emitting surface adjoining the first light-emitting surface, wherein an outer angle between two respective reference surfaces extending from the first light-emitting surface and the second light-emitting surface is substantially between 90 degrees and 180 degrees. The first light-emitting surface and the second light-emitting surface form an angle substantially between 90 degrees and 180 degrees.

Hence, the present invention may provide an LCD comprising a rectangle frame having four connected sides, a reflector adjacent to the light guide plate, an optical film disposed on the reflector, and a liquid crystal panel disposed on the optical membrane, wherein the light guide plate is mounted in the rectangle frame, and at least one LED is disposed on one of the four connected sides, and the liquid crystal panel is embedded in the rectangle frame.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
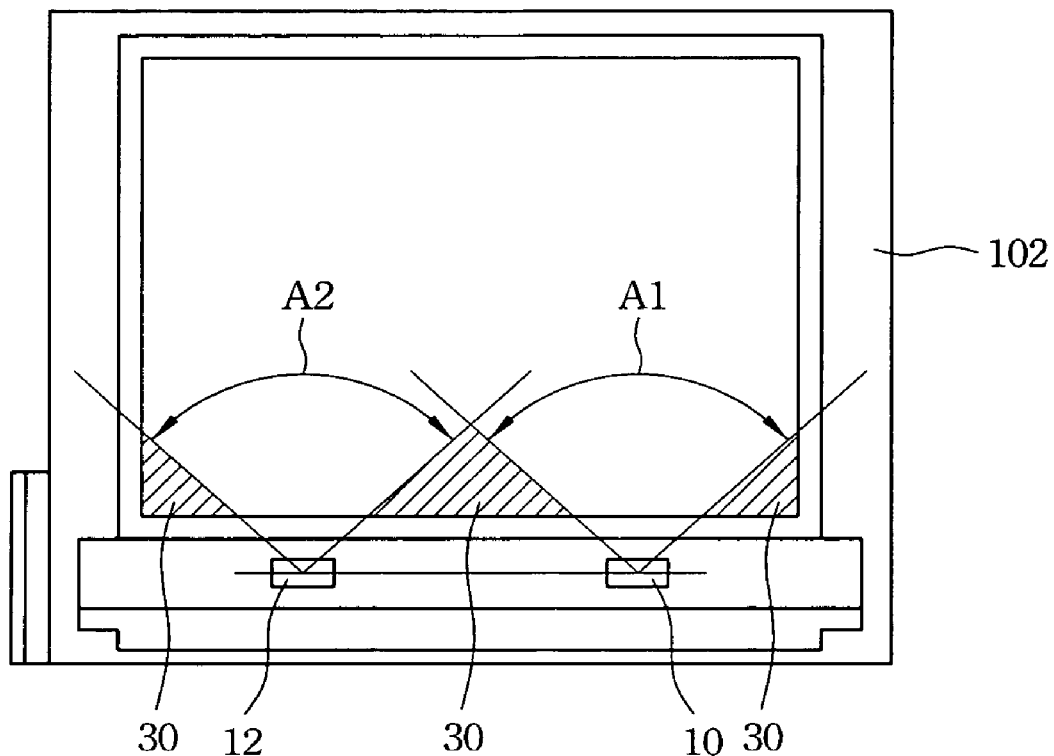
FIG. 1 is a schematic LCD illustrating dark stripes according to the related art.

Reference will now be made in detail to the present preferred embodiments of the invention, examples of which are illustrated in the accompanying drawings. Wherever possible, the same reference numbers are used in the drawings and the description to refer to the same or like parts.

The present invention is featured in mounting two tightly adjacent LEDs near a light-guide plate; tilting each of the LEDs outwards with a predetermined angle, wherein an outer angle extending from two respective light-emitting surfaces of the LEDs is about between 90 degrees and 180 degrees.

Figure 2A:
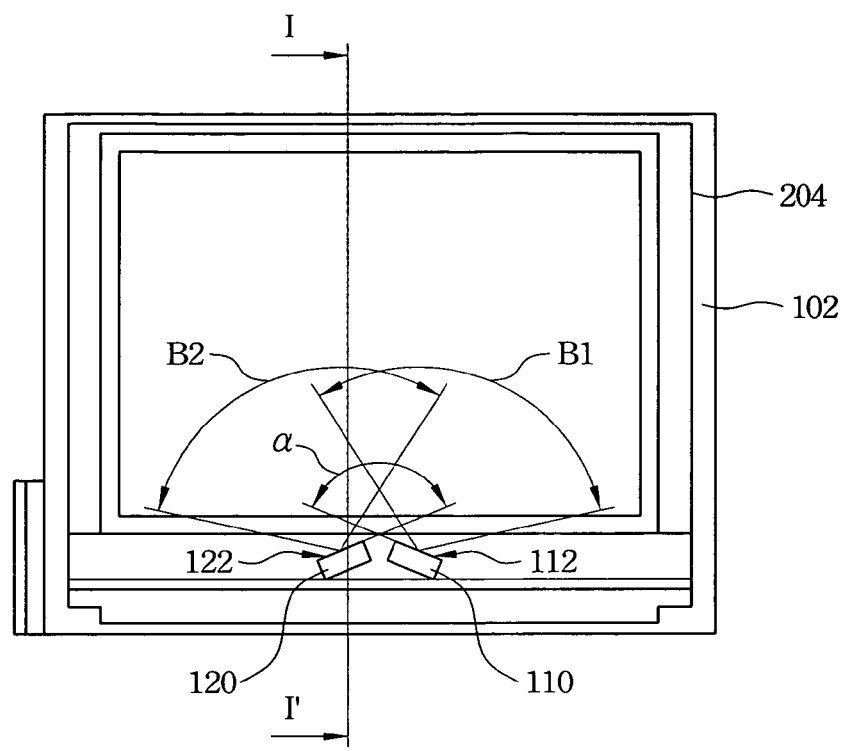
FIG. 2A is an LCD according to a preferred embodiment of the present invention.
Figure 2B:
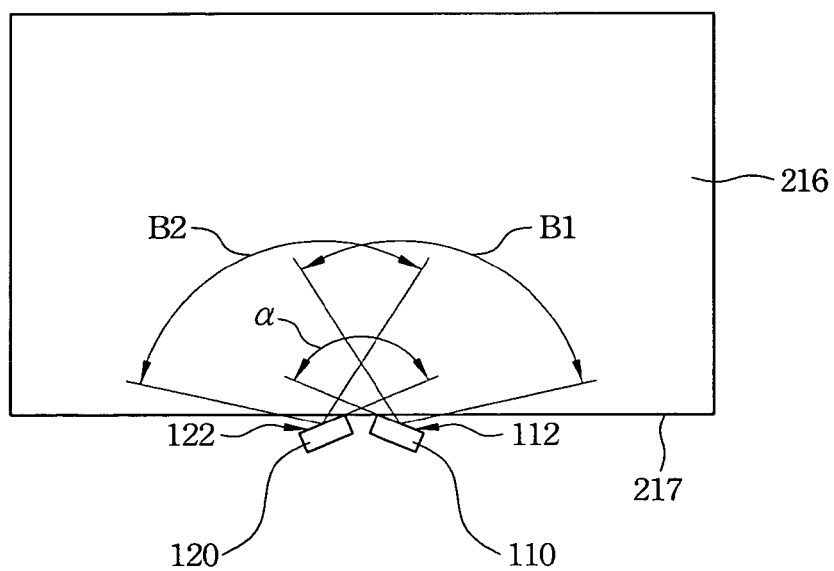
FIG. 2B is a schematic backlight module according to the preferred embodiment of the present invention.

Referring to FIG. 2A and FIG. 2B, FIG. 2A is an LCD according to a preferred embodiment of the present invention, and FIG. 2B is a backlight module according to the preferred embodiment of the present invention.

Such as shown in FIG. 2A, the LED of the present invention comprises a rectangle frame 102 having four connected sides, a liquid crystal panel 204 embedded in the rectangle frame 102, and a backlight module (not labeled), wherein the backlight module comprises a light guide plate 216 (such as shown in FIG. 2B), an LED 110 having a light-emitting surface 112, and an LED 120 having a light-emitting surface 122, the LED 110 and the LED 120 are disposed near the light guide plate 216, i.e. on one of the four connected sides of the rectangle frame 102, and the LED 110 and the LED 120 are preferably attached to a side 217 of the light guide plate 216 for effectively making use of the light provided from the LED 110 and the LED 120. The LED 110 is disposed near the LED 120, and preferably, the LED 120 is tightly adjacent to the LED 110, i.e. the closer the LED 110 is to the LED 120, the better the irradiation result is. Each of the LED 110 and the LED 120 is tilted outwards with a predetermined angle, thereby forming an outer angle α between two respective reference surfaces extending from the light-emitting surface 112 and the light-emitting surface 122 as the value between about 90 degrees and about 180 degrees, wherein the LED 110 and the LED 120 can be red LEDs, green LEDs, blue LEDs, white LEDs or any combinations thereof. Such as shown in FIG. 2A or FIG. 2B, the LEDs 110 and the LED 120 have light scattering angles B1 and B2 respectively, each of which is between about 90 degrees and about 110 degrees. Thus, when the outer angle α between the light-emitting surface 112 of the LED 110 and the light-emitting surface 122 of the LED 120 is between about 90 degrees and about 180 degrees, the irradiation range of the light emitted to the light guide plate 216 due to the accumulative effect of the scattering angles B1 and B2 and the outer angle α can cover the active area of the LCD, thus reducing the dark-stripe regions shown in FIG. 1 for enhancing the display quality of the active area of the LCD.

Figure 3:
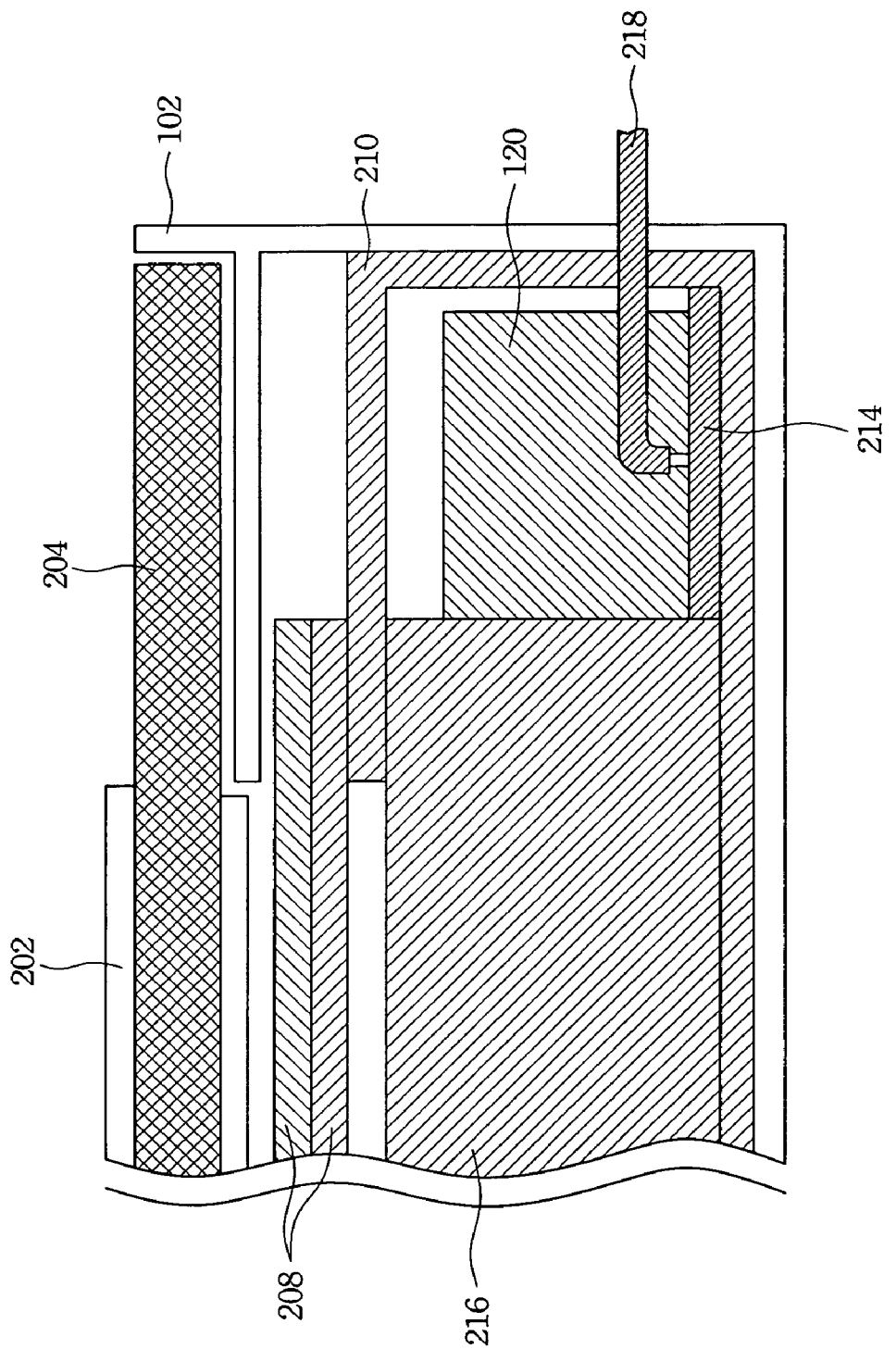
FIG. 3 is a schematic cross-sectional view along the line I-I' in FIG. 2A.

Further, referring to FIG. 3, FIG. 3 is a schematic cross-sectional view along the line I-I' in FIG. 2A. Such as shown in FIG. 3, in the LCD from top to bottom, there are a polarizer 202, the liquid crystal panel 204, the rectangle frame 102, an optical film 208, a reflector 210, the LED 120, an electrical circuit board 214, the light guide plate 216 and a wire 218, wherein the reflector 210 encloses the LED 120 and the electrical circuit board 214, and also is adjacent to the light guide plate 216; and the polarizer 202, the liquid crystal panel 204, the rectangle frame 102 and the optical film 208 are stacked in sequence on the reflector 210. The wire 218 is electrically connected to the electrical circuit board 214. The reflector 210 is used for reflecting the light provided by the LED 120 to the light guide plate 216, so that the location and shape of the reflector 210 is not limited to what are shown in FIG. 3, and other locations and shapes of the reflector 210 are also applicable to the present invention, as long as the aforementioned function of the reflector 210 can be achieved.

Figure 4:
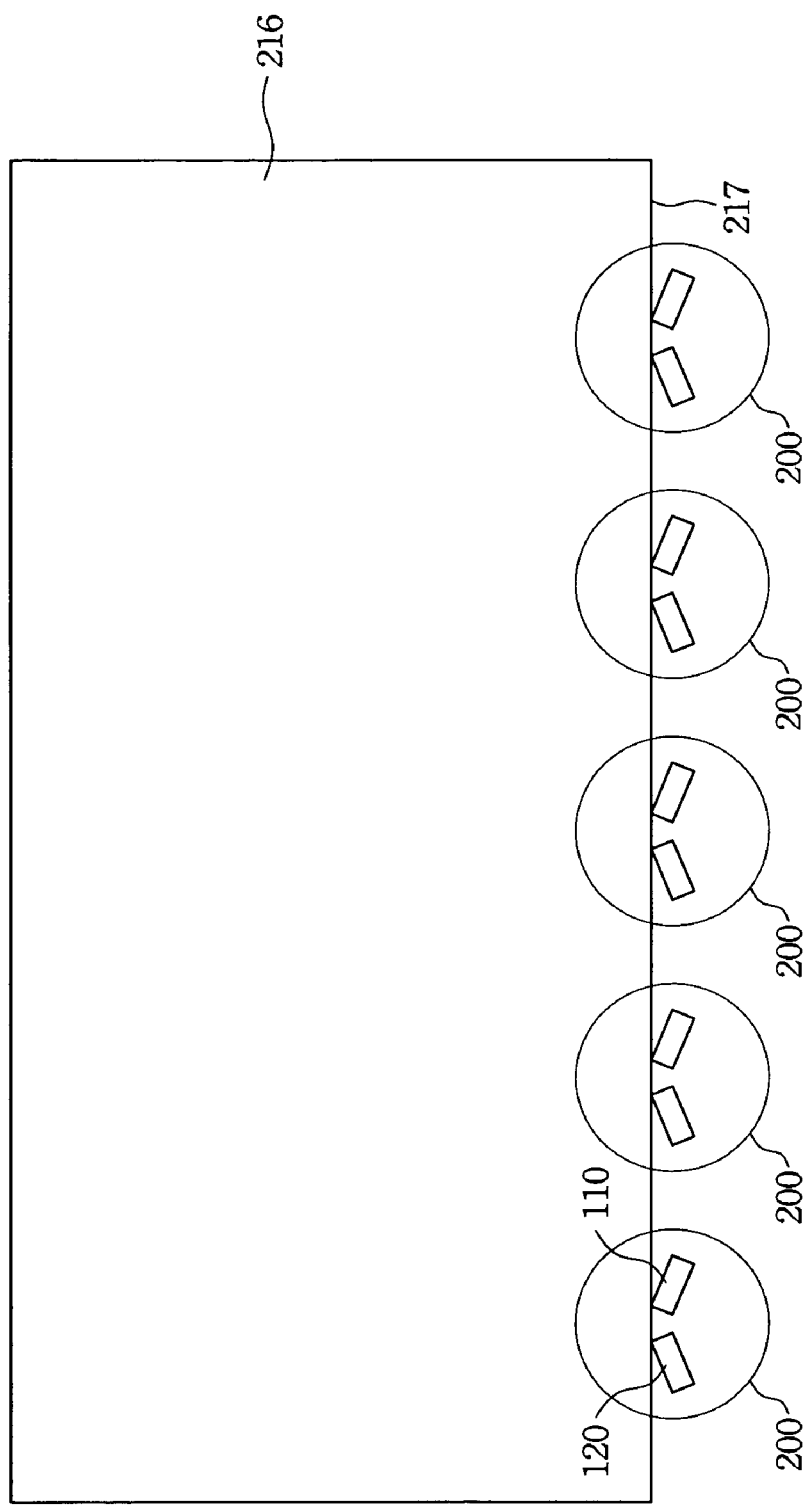
FIG. 4 is a schematic backlight module according to another preferred embodiment of the present invention.

Referring to FIG. 4, FIG. 4 is a schematic backlight module according to another preferred embodiment of the present invention. Generally speaking, in accordance with the size of the display panel, the backlight module needs to use multiple LEDs for ensuring the display panel to have sufficient lightness. Such as shown in FIG. 4, in the application of the present invention, the LEDs 110 and 120 shown in FIG. 2A or FIG. 2B can be combined as an LED set 200, and preferably, both are packaged as one unit. Thereafter, a plurality of LED sets 200 are disposed near the side 217 of the light guide plate 216. Since each of LED sets 200 composed of two LEDs has been able to effectively reduce the dark-stripe regions, the LED sets 200 may be evenly or unevenly distributed in accordance with the actual needs. The LED sets 200 also can be mounted near different sides of the light guide plate 216 (i.e. on different sides of the rectangle frame). It is worthy to be noted that, when the LED 110 and the LED 120 are packaged as one unit (the LED set 200), the distance between the LED 110 and the LED 120 are reduced to minimum, thus increasing the effect of reducing the dark-stripe regions; and enhancing the application convenience.

Figure 5:
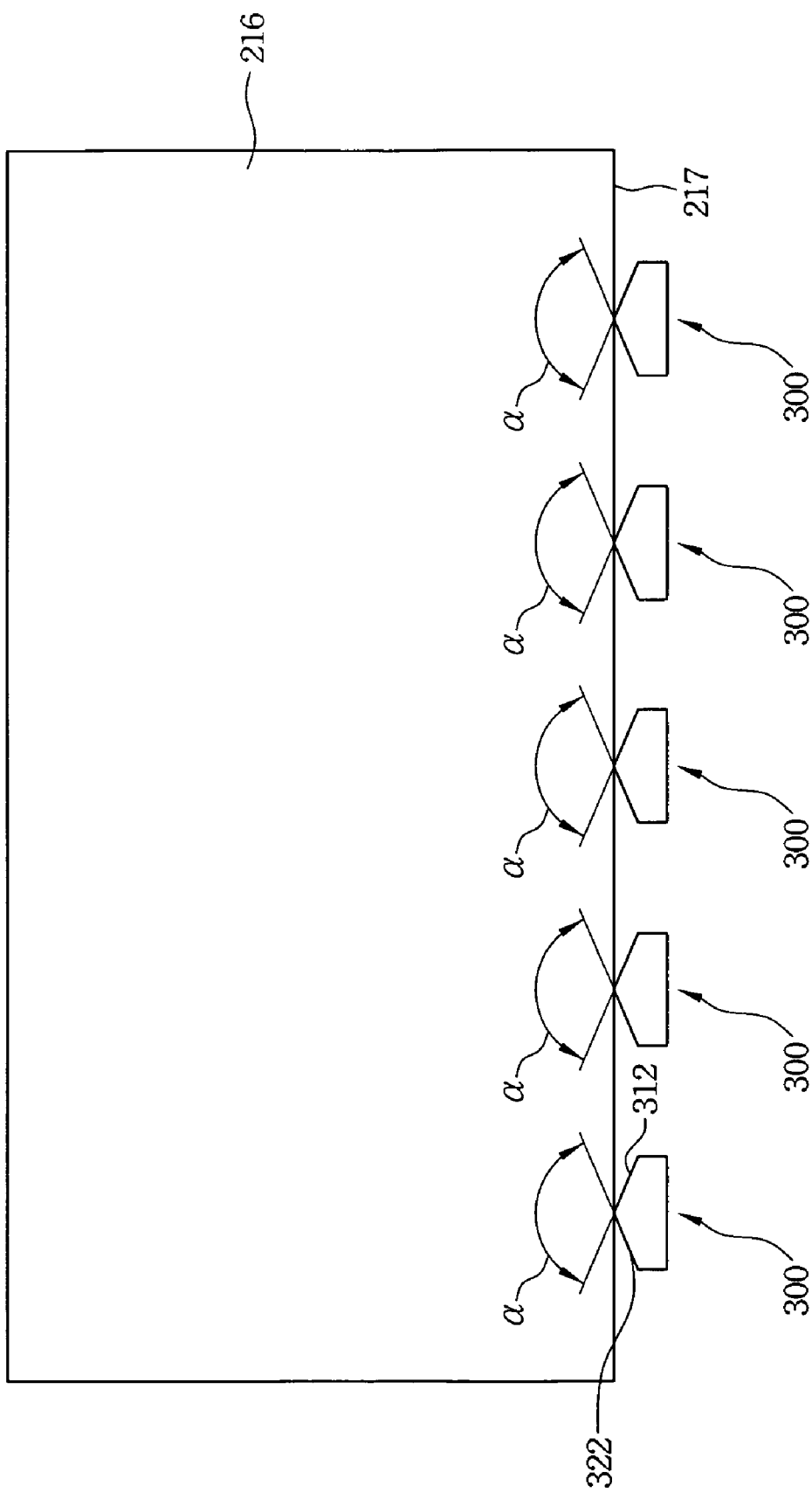
FIG. 5 is a schematic backlight module according to still another preferred embodiment of the present invention.

Further, referring to FIG. 5, FIG. 5 is a schematic backlight module according to still another preferred embodiment of the present invention. In the application of the present invention, the structure formed from the LEDs 110 and 120 shown in FIG. 2A or FIG. 2B can be fabricated as an LED 300 including light-emitting surfaces 312 and 322, wherein the light-emitting surface 312 is equivalent to the light-emitting surface 112 shown in FIG. 2B, and the light-emitting surface 322 is equivalent to the light-emitting surface 122 shown in FIG. 2B. The light-emitting surface 312 adjoins the light-emitting surface 322, and an outer angle α between two respective reference surfaces extending from the light-emitting surface 312 and the light-emitting surface 322 is between about 90 degrees and about 180 degrees. The light-emitting surface 312 and the light-emitting surface 322 form an angle substantially between 90 degrees and 180 degrees. Then, at least one LED 300 is disposed near the light guide plate 216. Since one single LED 300 has been able to effectively reduce the dark-stripe regions, a plurality of LEDs 300 may be mounted near the same side or different sides of the light guide plate 216, wherein the LEDs 300 may be evenly or unevenly distributed in accordance with the actual needs. It is worthy to be noted that, when the LED 300 is applied, the light-emitting surface 312 is almost connected to the light-emitting surface 322, thus increasing the effect of reducing the dark-stripe regions; and enhancing the application convenience.

Moreover, each of the backlight modules described in the aforementioned preferred embodiments is contained in an LCD. Besides the aforementioned backlight module, the LCD provided by the present invention comprises s a rectangle frame, a reflector, an optical film and a liquid crystal panel. The rectangle frame has four connected sides, and the light guide plate is mounted in the rectangle frame. At least one LED of the backlight module of the present invention is disposed on one of the four connected sides of the rectangle frame, and a reflector adjoins the light guide plate of the backlight module. The optical film is disposed on the reflector, and the liquid crystal panel is disposed on the optical membrane, and the liquid crystal panel is embedded in the rectangle frame.

It can be known from the preferred embodiments described above, the present invention has the advantages of effectively reducing the dark-stripe regions, and enhancing the application convenience, thus greatly promoting the display quality and reducing production cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A Light-emitting Diode (LED) backlight module, comprising:
   a light guide plate having opposite main surfaces and a plurality of side surfaces, wherein each of the main surfaces is larger than each of the side surfaces, and at least one of the side surfaces is straight;
   a first LED having a first light-emitting surface, wherein the first LED is disposed near the light-guide plate and along the straight side surface; and
   a second LED, disposed adjacent to the first LED and along the straight side surface, having a second light-emitting surface, wherein an opposite surface of the first light-emitting surface and that of the second light-emitting surface form an angle substantially between 90 degrees and 180 degrees, and the opposite surface of the first light-emitting surface and the opposite surface of the second light-emitting surface are flat.

2. The LED backlight module as claimed in claim 1, wherein at least one of the first LED and the second LED has a light scattering angle ranging from about 90 degrees to about 110 degrees.

3. The LED backlight module as claimed in claim 1, wherein the first LED and the second LED are packaged as one unit.

4. The LED backlight module as claimed in claim 1, wherein at least one of the first LED and the second LED is a white-light LED.

5. The LED backlight module as claimed in claim 1, wherein the first LED has a light scattering area, the second LED has a light scattering area, and the light scattering area of the first LED overlaps the light scattering area of the second LED.

6. The LED backlight module as claimed in claim 1, wherein the emitting light of the first LED is not parallel with the emitting light of the second LED.

7. The LED backlight module as claimed in claim 1, wherein the first light-emitting surface faces to the straight side surface.

8. The LED backlight module as claimed in claim 1, wherein the second light-emitting surface faces to the straight side surface.

9. An LCD comprising:
   an LED backlight module, comprising:
      a light guide plate having a straight side;
      a first light-emitting diode (LED) having a first light-emitting surface, wherein the first LED is disposed near the light-guide plate and along the straight side; and
      a second LED having a second light-emitting surface, wherein the second LED is disposed adjacent to the first LED and along the straight side, an opposite surface of the first light-emitting surface and that of the second light-emitting surface form an angle substantially between 90 degrees and 180 degrees, and the opposite surface of the first light-emitting surface and the opposite surface of the second light-emitting surface are flat;
   a rectangle frame having four connected sides, wherein the light guide plate is mounted in the rectangle frame, and the first LED and the second LED are disposed on one of the four connected sides; and
   a liquid crystal panel disposed on an optical film, wherein the liquid crystal panel is embedded in the rectangle frame.

10. The LCD as claimed in claim 9, wherein the first LED has a light scattering area, the second LED has a light scattering area, and the light scattering area of the first LED overlaps the light scattering area of the second LED.

11. The LCD as claimed in claim 9, wherein the emitting light of the first LED is not parallel with the emitting light of the second LED.

12. The LCD as claimed in claim 9, wherein the first light-emitting surface faces to the straight side.

13. The LCD as claimed in claim 9, wherein the second light-emitting surface faces to the straight side.

14. A Light-emitting Diode (LED) backlight module, comprising:
   a light guide plate having a main surface and a straight side surface, wherein the main surface is larger than the straight side surface;
   a first LED having a first light-emitting surface and a light scattering area, wherein the first LED is disposed near the light guide plate and along the straight side surface, and the first LED does not overlap the main surface in a vertical direction; and
   a second LED, disposed adjacent to the first LED and along the straight side surface, having a second light-emitting surface and a light scattering area, wherein an opposite surface of the first light-emitting surface and that of the second light-emitting surface form an angle substantially between 90 degrees and 180 degrees, and the light scattering area of the first LED overlaps the light scattering area of the second LED.

* * * * *